United States Patent
Duffy et al.

(10) Patent No.: US 9,436,744 B2
(45) Date of Patent: Sep. 6, 2016

(54) COMBINING INTERNAL AND EXTERNAL SEARCH RESULTS

(71) Applicant: Accenture Global Services Limited, Dublin (IE)

(72) Inventors: Michael P. Duffy, Highland Village, TX (US); Xingxin Liu, Union City, CA (US); Roy Vera, Houston, TX (US); William C. Hall, Cedar Park, TX (US)

(73) Assignee: Accenture Global Services Limited, Dublin (IE)

( * ) Notice: Subject to any disclaimer, the term of this patent is extended or adjusted under 35 U.S.C. 154(b) by 233 days.

(21) Appl. No.: 14/273,046

(22) Filed: May 8, 2014

(65) Prior Publication Data
US 2015/0324433 A1 Nov. 12, 2015

(51) Int. Cl.
*G06F 17/30* (2006.01)

(52) U.S. Cl.
CPC ... *G06F 17/30554* (2013.01); *G06F 17/30312* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,920,854 A | 7/1999 | Kirsch et al. | |
| 6,278,993 B1 | 8/2001 | Kumar et al. | |
| 6,327,590 B1 | 12/2001 | Chidlovskii et al. | |
| 6,336,117 B1 | 1/2002 | Massarani | |
| 6,490,575 B1 | 12/2002 | Berstis | |
| 7,386,599 B1 | 6/2008 | Piersol et al. | |
| 7,617,203 B2 | 11/2009 | Awadallah et al. | |
| 7,693,825 B2 | 4/2010 | Wang et al. | |
| 7,792,857 B1 * | 9/2010 | Brette | G06F 17/30657 707/771 |
| 8,126,818 B2 | 2/2012 | Rhoads et al. | |
| 2003/0046098 A1 | 3/2003 | Kim | |
| 2005/0165777 A1 * | 7/2005 | Hurst-Hiller | G06F 17/30545 |
| 2006/0064411 A1 * | 3/2006 | Gross | G06F 17/30864 |
| 2010/0114561 A1 * | 5/2010 | Yasin | G06F 17/3071 704/9 |
| 2010/0306213 A1 | 12/2010 | Taylor et al. | |
| 2012/0057688 A1 | 3/2012 | Pickering | |
| 2012/0271807 A1 | 10/2012 | Smyth et al. | |
| 2014/0046926 A1 * | 2/2014 | Walton | G06Q 50/22 707/710 |

OTHER PUBLICATIONS

European Search Report corresponding to EP Application No. 15166906.6 mailed on Sep. 18, 2015, 7 pages.
Microsoft Corporation, "SharePoint 2013 Overview", http://office.microsoft.com/en-in/sharepoint/sharepoint-2013-overview-collaboration-software-features-FX103789323.aspx, Jun. 26, 2013, 2 pages.

(Continued)

*Primary Examiner* — Bai D. Vu
(74) *Attorney, Agent, or Firm* — Harrity & Harrity, LLP

(57) ABSTRACT

A device may receive information that identifies a search query. The device may use the search query to cause a search of internal and external documents to be performed to identify internal and external search results. The device may cause the internal search results and the external search results to be presented for display. The internal search results may be presented for display to visually distinguish the internal search results from the external search results. The device may receive an indication that an external search result has been flagged for review, and may provide a notification that the external search result has been flagged for review. The device may determine that the external search result has been approved for presentation as an internal search result, and may store an indication that the external search result is to be identified as an internal search result for a future search.

20 Claims, 13 Drawing Sheets

(56) References Cited

OTHER PUBLICATIONS

SharePoint AMS, "Improve Findability Using SharePoint Search", https://www.sharepoints.com/en/Blog/Pages/Improve-Findability-Using-SharePoint-Search.aspx#.Uty4N9K6Zkg, Mar. 1, 2013, 3 pages.

Matthew McDermott, "SharePoint: Get Started with Search Results", https://www.nothingbutsharepoint.com/sites/eusp/pages/sharepoint-get-started-with-search-results.aspx, Jan. 11, 2012, 8 pages.

IBM Corporation, "Enterprise search integration with WebSphere Portal", http://publib.boulder.ibm.com/infocenter/discover/v8r4/index.jsp?topic=/com.ibm.discovery.es.ad.doc/administering/iiysaltwhyws.htm, Nov. 2006, 2 pages.

Google Developers, "Getting the Most from Your Google Search Appliance: Introduction", https://developers.google.com/search-appliance/documentation/614/QuickStart/quick_start_intro, Aug. 23, 2012, 3 pages.

Google Developers, "Planning for Search Appliance Installation", https://developers.google.com/search-appliance/documentation/614/planning/planning, Dec. 17, 2012, 12 pages.

Google Inc., "Google Search Appliance", http://static.googleusercontent.com/media/www.google.com.au/en/au/intl/en_uk.enterprise/pdf/gsa_datasheet.pdf, Oct. 19, 2010, 6 pages.

Exalead, "Exalead B2C Portal Pack", http://fr.3ds.exalead.com/software/common/pdfs/solutions/ebusiness/Exalead-B2C-Portal-Pack.pdf, Jul. 18, 2008, 4 pages.

SurfWax, "Targeted Multi-source (federated) Searching of the Open Web", http://www.surfwax.com/technology/search.htm, Aug. 23, 2003, 2 pages.

Infogistics Limited, "RealTerm Dynamic Content Management Solution (White Paper)", http://www.infogistics.com/realterm-white.pdf, Feb. 1, 2002, 13 pages.

Stefan Dessloch et al., "Integrating SQL Databases with Content-specific Search Engines", http://www.cs.cornell.edu/courses/cs732/2003sp/papers/Debloch1997.pdf, 1997, 9 pages.

SVA-software, "7sDoc", http://7s.backupforall.com/, Oct. 24, 2010, 1 page.

IEEE, "The integration of the World Wide Web and intranet data resources", http://ieeexplore.ieee.org/xpl/login.jsp?tp=&arnumber=655306&url=http%3A%2F%2Fieeexplore.ieee.org%2Fiel4%2F5217%2F14270%2F00655306, Sep. 21, 2006, 2 pages.

Stan Lovic et al., "Enhancing Search Engine Performance Using Expert Systems", Information Reuse and Integration, 2006, IEEE International Conference on, Sep. 16-18, 2006, 6 pages.

IEEE, "Web Search with personalization and knowledge", http://ieeexplore.ieee.org/xpl/articleDetails.jsp?tp=&arnumber=1181600&queryText%3Dinternet+search+engine+and+intranet+search+engine, Sep. 21, 2006, 2 pages.

IEEE, "Users, Queries and Documents: A Unified Representation for Web Mining", http://ieeexplore.ieee.org/xpl/articleDetails.jsp?tp=arnumber=5286068&queryText%3Dinternet+search+engine+and+intranet+search+engine, 2009, 2 pages.

* cited by examiner

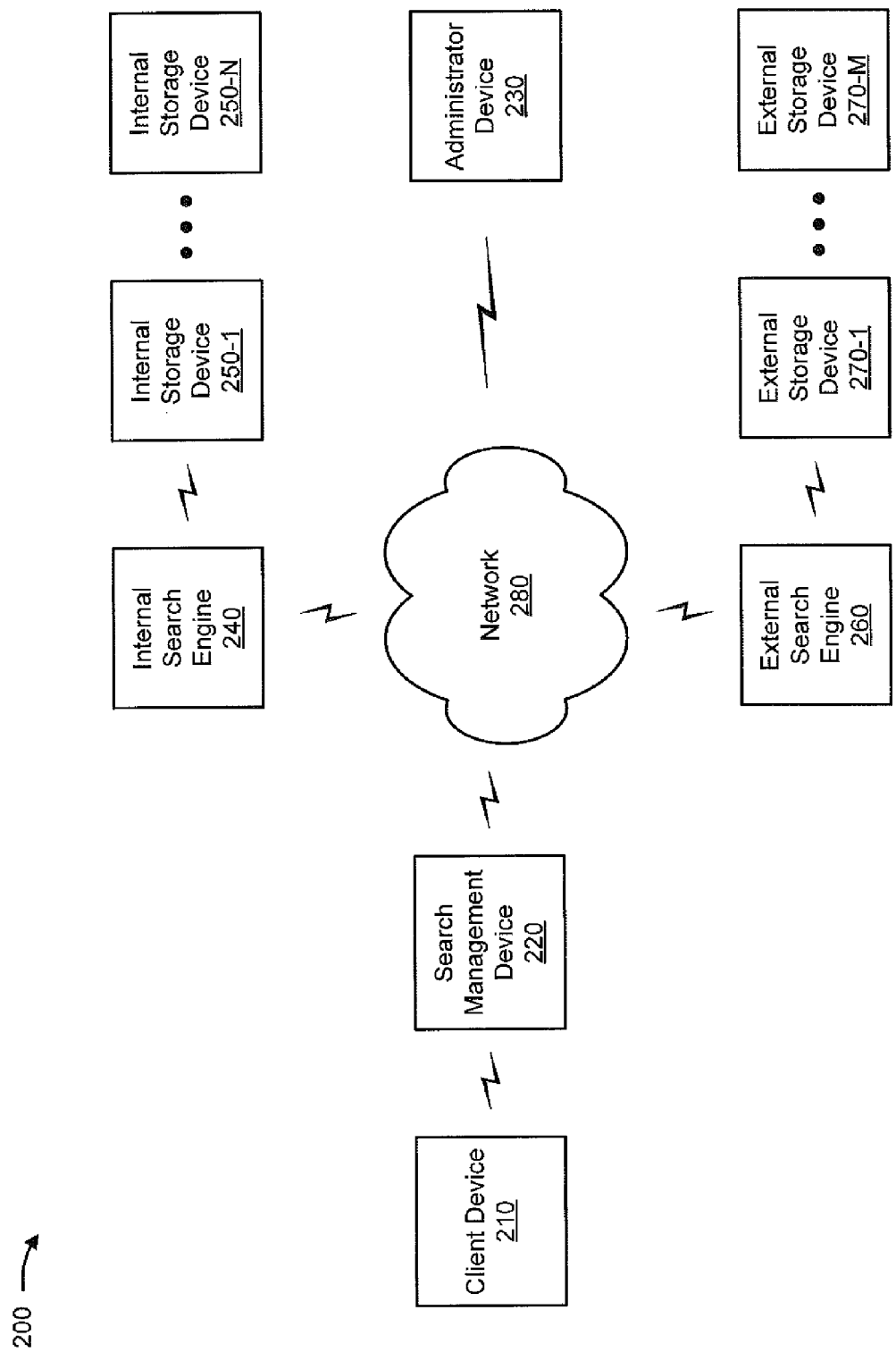

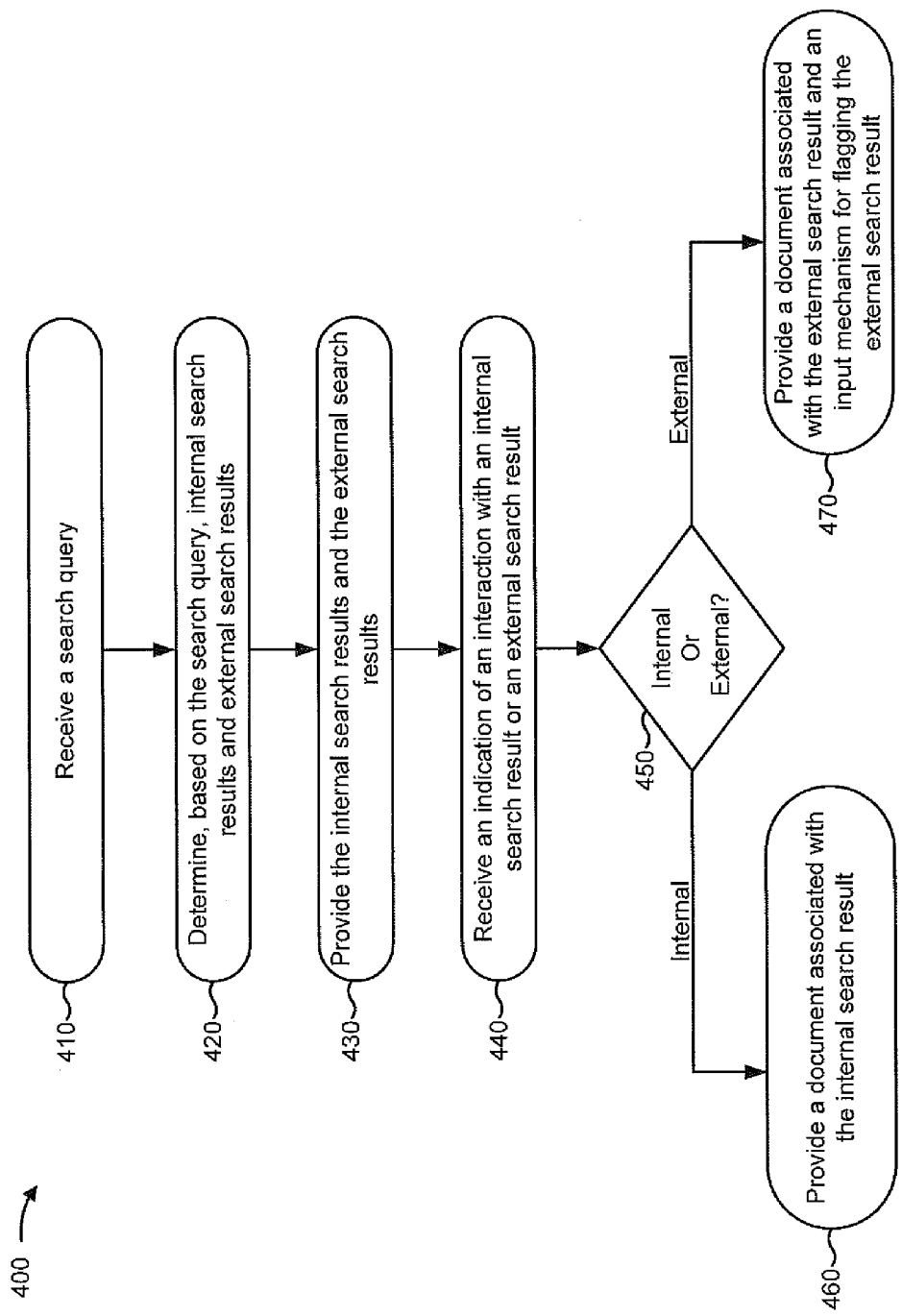

Search Management Portal

Home | My Profile | FAQs | Connect

🔍 Search | Go

Manage Knowledge Base

| Source Title | URL | Likes/Dislikes | Latest Like Time | Tag(s) | Approved Topic(s) OR Approve/Reject | Edit Pres. Info |
|---|---|---|---|---|---|---|
| AL-Test | www.test.com | | 4/19/2012 8:45:30 AM | Internet, Mac, Mobile | Approved Topic: Adobe Photoshop | Edit |
| Test-billy | www.google.com | | 4/19/2012 8:50:43 AM | undefined | Approved Topic: General Requests | Edit |
| Test-billy | www.google.com | | 4/19/2012 8:51:31 AM | undefined | Approved Topic: General Requests | Edit |
| Sony Pictures | www.sonypictures.com | | 4/19/2012 8:52:19 AM | broadband | Approved Topic: Adobe Photoshop | Edit |
| Google | www.google.com | | 4/19/2012 8:52:37 AM | getting, Internet, undefined | Approved Topic | |
| Chevron Corporation Home – Human Energy | www.chevron.com | | 4/20/2012 3:35:30 AM | | | |
| Checkbox – Wikipedia, the free encyclopedia | en.wikipedia.org/wiki/Checkbox | | 4/20/2012 5:26:24 AM | checkbox | Approve / Reject | |
| Lemon – A fresh way to see your money and spend it smarter | lemon.com | | 4/20/2010 6:13:50 AM | lemon | Approve / Reject | |
| Try- Medical definiting and More from Merriam-Webster | meriam-weaster.com/medical/tr | | 5/29/2012 4:45:36 PM | try | Approve / Reject | |
| Office 2010 Products – Office.com 710 | office.microsoft.com/en-us/products/ | | 6/8/2012 12:21:10 PM | office 2010 | Approve / Reject | |
| The Office | www.nbc.com/The_Office/ | | 5/13/2012 11:18:04 AM | office | Approved Topic: Office for Windows 2010 | Edit |
| Microsoft Office 2010 – Wikipedia, the free encyclopedia | en.wikipedia.org/wiki/microsoft_office_2010 | | 10/8/2012 10:23:02 AM | office 2010 | Approve / Reject | |
| Windows 7 – Microsoft Windows | windows.microsoft.com/en-US/windows7/products/home | | 11/9/2012 7:15:28 PM | windows 7 | Approve / Reject | |

720

Edit Source

Home > Manage Knowledge Base > Edit Source

- Title*: Office 2010 Products – Office.com
- Source Link*: Http://office.microsoft.com/en-us/products/
- Description: Office 2010 Products – Office.com Buy Office 365 for home or for
- Category Lvl1*: Applications ▶
- Category Lvl2*: Communications and Sharing ▶
- Recommend Content: ☐
- Added by: User A
- Added time: 8:30 AM
- Topic*: Office for Windows 2010 [Edit]   — 730
  [Add]
- Tag*: office 2010 [Edit]

[Cancel] [Submit]

* = required field

Search Management Portal

Home  My Profile  FAQs  Connect

Home > Topics > Office for Windows 2010

Office for Windows 2010

Updated on: 6/10/2012

Overview:
With Microsoft Office 2010 get the benefits of all the programs you need to be productive including Microsoft Outlook 2010-so you can tackle your busy day effective with powerful email, scheduling and social networking tools Description:
Microsoft Office 2010 includes:

Microsoft Excel 2010:
Saving for retirement, keeping track of tax information, tracking business expense-all are important financial decisions. Microsoft Excel 2010 offers clear insight with simple templates to help you build budget and break expenses so you can focus on financial goals Microsoft Outlook 2010:
Whether you're working from home or on the road, Microsoft Outlook 2010 help you communicate with important contacts, manage email conversations and monitor your schedule from your PC or remotely. Simply post documents to online folders to access and edit remotely

...

Tags:              Office, Word, Excel, Outlook, PowerPoint

Relevant Links:    Office 2010—Office.com ◄——— 740
                   ...

[Edit]

FIG. 7C

Private Web Portal

Home   My Profile   FAQs   Connect

[Office]   Go

Review Search Results

Internal Search: 20 results | External Search: 9 results

We found 20 results for "office" from internal knowledge base, to see external search result click on the tab above

750

Office 2010 – Office.com ☆ (Approved external search result)
Try or buy Office 365 for Home or Business, view product information, get help and...

Directions to our office
View maps and get driving directions

Office Policies and Procedures
Our office general policies and procedures by the HR Department

Office Locations
A list of our locations and client locations throughout the area

Office Directories
Use this directory service to find and contact clients and employees.

Office Management
John Smith- CEO, Ronald McDonald- CFO, Brittany Peters- Head of HR....

Microsoft Office
Contact IT to make sure you are updated on all Microsoft Office software

FIG. 7D

COMBINING INTERNAL AND EXTERNAL SEARCH RESULTS

BACKGROUND

A search engine may refer to an information retrieval system designed to help find information stored on a computer system. Search results, determined by the search engine based on a search query, may be presented in a list that sorts the search results based on relevance with the search query. Search engines help reduce an amount of time required to find information.

SUMMARY

According to some possible implementations, a device may receive information that includes a search query. The device may cause a search of internal documents to be performed, using the search query, to identify one or more internal search results, and may cause a search of external documents to be performed, using the search query, to identify one or more external search results. The device may cause the one or more internal search results and the one or more external search results to be presented for display. The one or more internal search results may be presented for display to visually distinguish the one or more internal search results from the one or more external search results. The device may receive an indication that an external search result, of the one or more external search results, has been flagged for review, and may provide, based on receiving the indication, a notification that the external search result has been flagged for review. The device may determine that the external search result has been approved for presentation as an internal search result based on providing the notification, and may store an indication that the external search result is to be identified as an internal search result for a future search based on determining that the external search result has been approved for presentation as an internal search result.

According to some possible implementations, a computer-readable medium may include one or more instructions that, when executed by one or more processors, cause the one or more processors to: receive information that identifies a search query; cause a first search to be performed, using the search query, to identify one or more internal search results; cause a second search to be performed, using the search query, to identify one or more external search results, where the second search is separate from the first search; cause the one or more internal search results and the one or more external search results to be presented for display, where the one or more internal search results are presented for display in a first manner, and where the one or more external search results are provided for display in a second manner that is different from the first manner; receive an indication that an external search result, of the one or more external search results, has been flagged for review; provide, based on receiving the indication, a notification that the external search result has been flagged for review; determine whether the external search result has been approved or rejected for presentation as an internal search result based on providing the notification; and selectively store an indication that the external search result is to be presented as an internal search result based on determining whether the external search result has been approved or rejected, where the indication is stored when the external search result has been approved, and where the indication is not stored when the external search result has been rejected.

According to some possible implementations, a method may include receiving, by a device, information that identifies a search query. The method may include causing, by the device, a first search to be performed, using the search query, to identify one or more internal search results, and causing, by the device, a second search to be performed, using the search query, to identify one or more external search results. The method may include causing, by the device, the one or more internal search results to be presented for displayed in a first manner, and causing, by the device, the one or more external search results to be presented for displayed in a second manner that is different from the first manner. The method may include receiving, by the device, an indication that an external search result, of the one or more external search results, has been flagged for review, and providing, by the device and based on receiving the indication, a notification that the external search result has been flagged for review. The method may include determining, by the device, that the external search result has been approved for presentation in the first manner based on providing the notification. The method may include storing, by the device, an indication that the external search result has been approved for presentation in the first manner based on determining that the external search result has been approved for presentation in the first manner. The method may include causing, by the device, a third search, that identifies the external search result, to be performed after storing the indication, and causing, by the device, the external search result to be presented for display in the first manner based on the third search and further based on storing the indication that the external search result has been approved for presentation in the first manner.

BRIEF DESCRIPTION OF THE DRAWINGS

FIG. 2 is a diagram of an example environment in which systems and/or methods, described herein, may be implemented;

FIG. 4 is a flow chart of an example process for performing a search that provides internal and external search results, and flagging an external search result for review;

FIGS. 7A-7D are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A private web portal, such as a company intranet, may provide a search feature that permits a user to search for information internal to the private web portal, and may provide search results that provide links to internal documents (e.g., company documentation, a company training manual, internal web pages, etc.). However, the internal documents may be insufficient for the user to find the information that the user is seeking. The search feature may be extended to permit the user to search for information external to the private web portal, and may return search results that provide links to external documents (e.g., external web pages). However, the external documents may not be relevant to a user's search, may not come from a reliable source, may provide information that is contrary to company policy, etc. Thus, a company administrator may wish to control external documents that are provided as search results. Implementations described herein assist an administrator in identifying relevant external documents, and assist a user by providing more relevant search results.

Figure 1A:
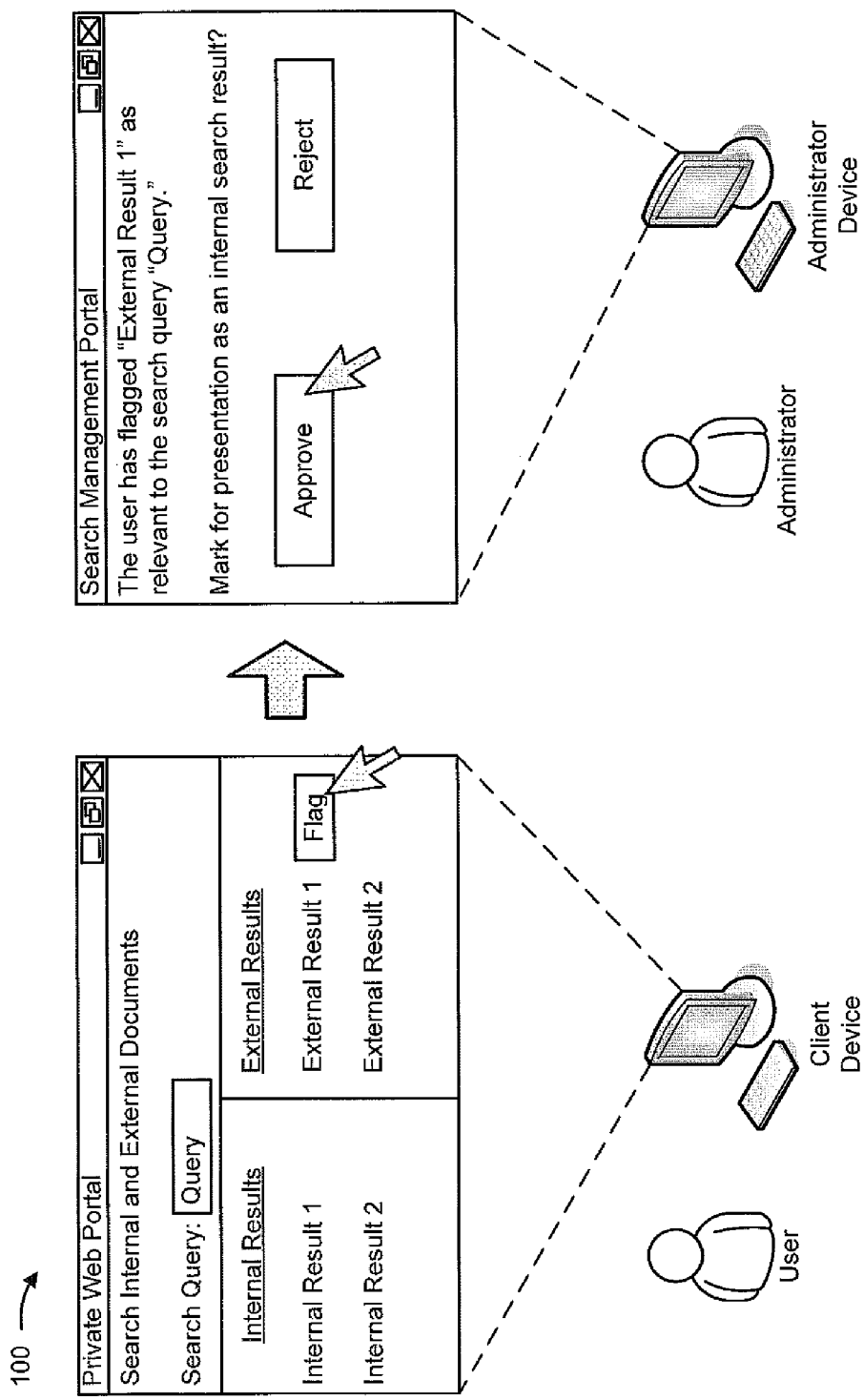
FIGS. 1A and 1B are diagrams of an overview of an example implementation described herein.
Figure 1B:
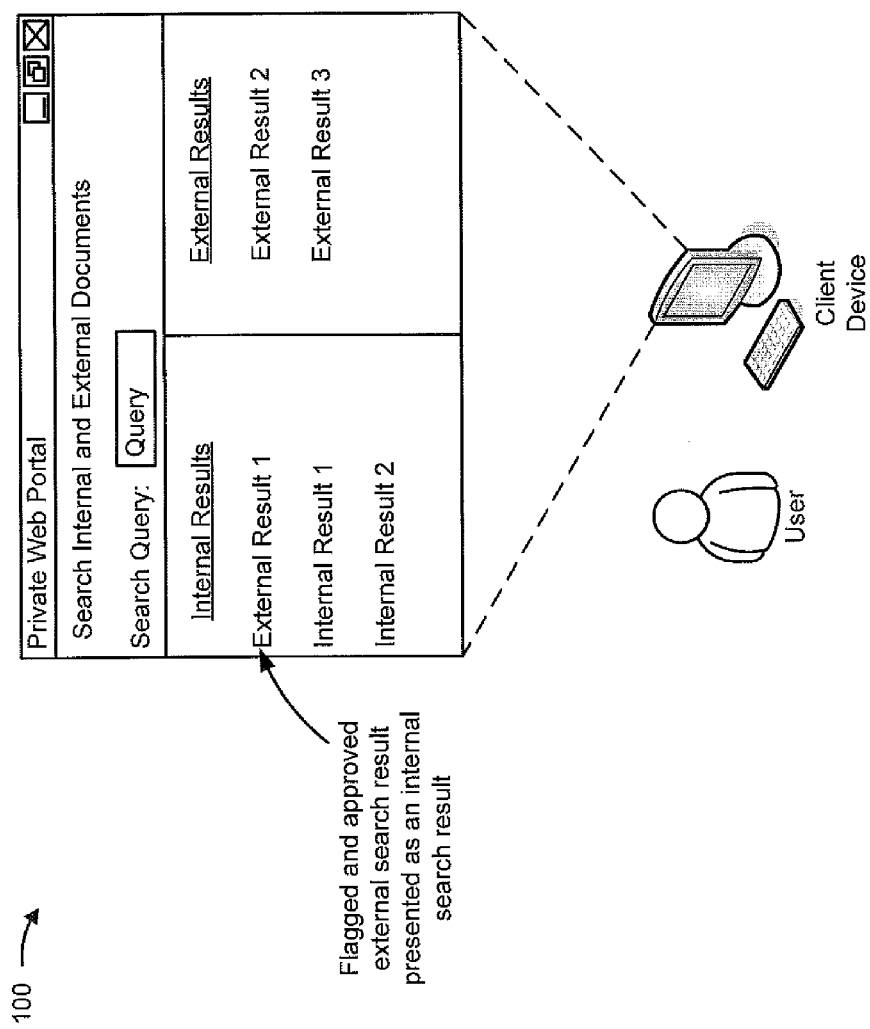

FIGS. 1A and 1B are diagrams of an overview of an example implementation 100 described herein. As shown in FIG. 1A, a user may use a client device to access a private web portal, and may use the private web portal to search for internal and external documents. For example, the user may input a search query. Based on the search query, an internal search engine may search for internal documents relevant to the search query, and an external search engine may search for external documents relevant to the search query. The client device may provide links to the internal and external documents. As shown, assume that the user's search query resulted in two internal search results, shown as Internal Result 1 and Internal Result 2, and that the user's search query resulted in two external search results, shown as External Result 1 and External Result 2.

As further shown in FIG. 1A, assume that the user determines that External Result 1 is relevant to the user's search query, and interacts with the private web portal to flag External Result 1. Based on the interaction, an administrator device may receive a notification that the user has flagged External Result 1 as relevant to the search query. An administrator may review External Result 1, and may determine whether to approve or reject External Result 1 for presentation as an internal search result (e.g., for future searches). For example, the administrator may determine that External Result 1 is relevant, and may approve External Result 1 for presentation as an internal search result (e.g., for future searches). As another example, the administrator may determine that External Result 1 includes information contrary to company policy, and may reject External Result 1 so that External Result 1 is not presented as an internal search result (and/or is not presented as an external search result, in some implementations) for future searches. As shown in FIG. 1A, assume that the administrator approves External Result 1.

As shown in FIG. 1B, assume that, at a later time, another user uses a client device to access the private web portal, and uses the private web portal to search for internal and external documents using the same search query (or a related search query). Based on the search query, the internal search engine may search for internal documents relevant to the search query, and the external search engine may search for external documents relevant to the search query. As shown, because External Result 1 was approved for presentation as an internal search result (e.g., was added to a repository of available internal documents, was marked as an internal search result, was identified in an internal search index, etc.), the internal results, generated based on the search query, include External Result 1. In this way, an administrator may exert greater control over information provided to users, so that users may be provided with more relevant information, information that is consistent with company policies, etc. Although External Result 1 is shown as being presented above Internal Result 1 and Internal Result 2, it should be understood that results could be presented in any order or scheme. For example, internal results can be presented above external results as a matter of course, or external results can be presented above internal results as a matter of course. Additionally, or alternatively, the order of presentation of results can be based on other techniques, such as counting the number and quality of links to a result, or a frequency that a particular result has been selected in prior searches.

FIG. 2 is a diagram of an example environment 200 in which systems and/or methods, described herein, may be implemented. As shown in FIG. 2, environment 200 may include a client device 210, a search management deice 220, an administrator device 230, an internal search engine 240, a set of internal storage devices 250-1 through 250-N (N≥1) (hereinafter referred to collectively as "internal storage devices 250," and individually as "internal storage device 250"), an external search engine 260, a set of external storage devices 270-1 through 270-M (M≥1) (hereinafter referred to collectively as "external storage devices 270," and individually as "external storage device 270"), and a network 280. Devices of environment 200 may interconnect via wired connections, wireless connections, or a combination of wired and wireless connections.

Client device 210 may include one or more devices capable of receiving, generating, storing, processing, and/or providing information associated with a search (e.g., a search query, a search result, etc.). For example, client device 210 may include a computing device, such as a desktop computer, a laptop computer, a tablet computer, a mobile phone (e.g., a smart phone, a radiotelephone, etc.), or a similar device. In some implementations, client device 210 may provide a private web portal that permits a user to search for internal documents and external documents (e.g., using internal search engine 240 and/or external search engine 260), and that provides internal search results (e.g., links to the internal documents) and external search results (e.g., links to the external documents) for display. In some implementations, client device 210 may provide an input mechanism that permits a user to flag search results for review.

Search management device 220 may include one or more devices capable of receiving, generating, storing, processing, and/or providing information associated with a search. For example, search management device 220 may include a computing device, such as a server, a desktop computer, or a similar device. Search management device 220 may assist in combining internal and external search results for presentation by client device 210. For example, search management device 220 may receive a search query from client device 210, may provide the search query to internal search engine 240 and external search engine 260, may receive internal search results from internal search engine 240, and may receive external search results from external search engine 260. Search management device 220 may mark the internal search results (e.g., as internal), may mark the external search results (e.g., as external), and may provide the marked search results to client device 210 so that client device 210 may present the internal and external search results in a different manner. In some implementations, search management device 220 may mark search results based on information received from administrator device 230 (e.g., may mark an external search result as an internal search result if the external search result is approved for presentation as an internal search result).

Administrator device 230 may include one or more devices capable of receiving, generating, storing, processing, and/or providing information associated with managing a search. For example, administrator device 230 may include a computing device, such as a desktop computer, a laptop computer, a tablet computer, a mobile phone (e.g., a smart phone, a radiotelephone, etc.), or a similar device. In some implementations, administrator device 230 may provide a search management portal that permits an administrator to receive notifications of flagged search results, and to provide instructions that control a manner in which search results are presented for display (e.g., by client device 210). For example, administrator device 230 may provide instructions (e.g., based on user input) to present an external search result as an internal search result.

Internal search engine 240 may include one or more devices capable of receiving, generating, storing, processing, and/or providing information associated with a search. For example, internal search engine 240 may include a server or a similar device. In some implementations, internal search engine 240 may receive a search query (e.g., from client device 210 and/or search management device 220), and may search for internal documents (e.g., stored by one or more internal storage devices 250) based on the search query. Internal search engine 240 may generate internal search results based on the search for internal documents, and may provide the internal search results (e.g., to search management device 220 and/or client device 210).

Internal storage device 250 may include one or more devices capable of storing, indexing, and/or searching internal documents (e.g., company documentation, a company training manual, documents associated with a private network, such as an intranet, etc.). For example, internal storage device 250 may include a server (e.g., a storage server), a database, a storage device, or the like. Internal search engine 240 may cause a search of one or more internal storage devices 250 to be performed based on a search query.

External search engine 260 may include one or more devices capable of receiving, generating, storing, processing, and/or providing information associated with a search. For example, external search engine 260 may include a server or a similar device. In some implementations, external search engine 260 may receive a search query (e.g., from client device 210 and/or search management device 220), and may search for external documents (e.g., stored by one or more external storage devices 270) based on the search query. External search engine 260 may generate external search results based on the search for external documents, and may provide the external search results (e.g., to search management device 220 and/or client device 210). In some implementations external search engine 260 may be a publicly addressable search engine, such as Google, Bing, etc.

External storage device 270 may include one or more devices capable of storing, indexing, and/or searching external documents (e.g., external web pages, etc.). For example, external storage device 270 may include a server (e.g., a storage server), a database, a storage device, or the like. External search engine 260 may cause a search of one or more external storage devices 270 to be performed based on a search query.

Network 280 may include one or more wired and/or wireless networks. For example, network 280 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, internal search engine 240 and external search engine 260 may be implemented within a single search engine device, client device 210 and search management device 220 may be implemented with a single device, etc. Additionally, or alternatively, a set of devices (e.g., one or more devices) of environment 200 may perform one or more functions described as being performed by another set of devices of environment 200.

Figure 3:
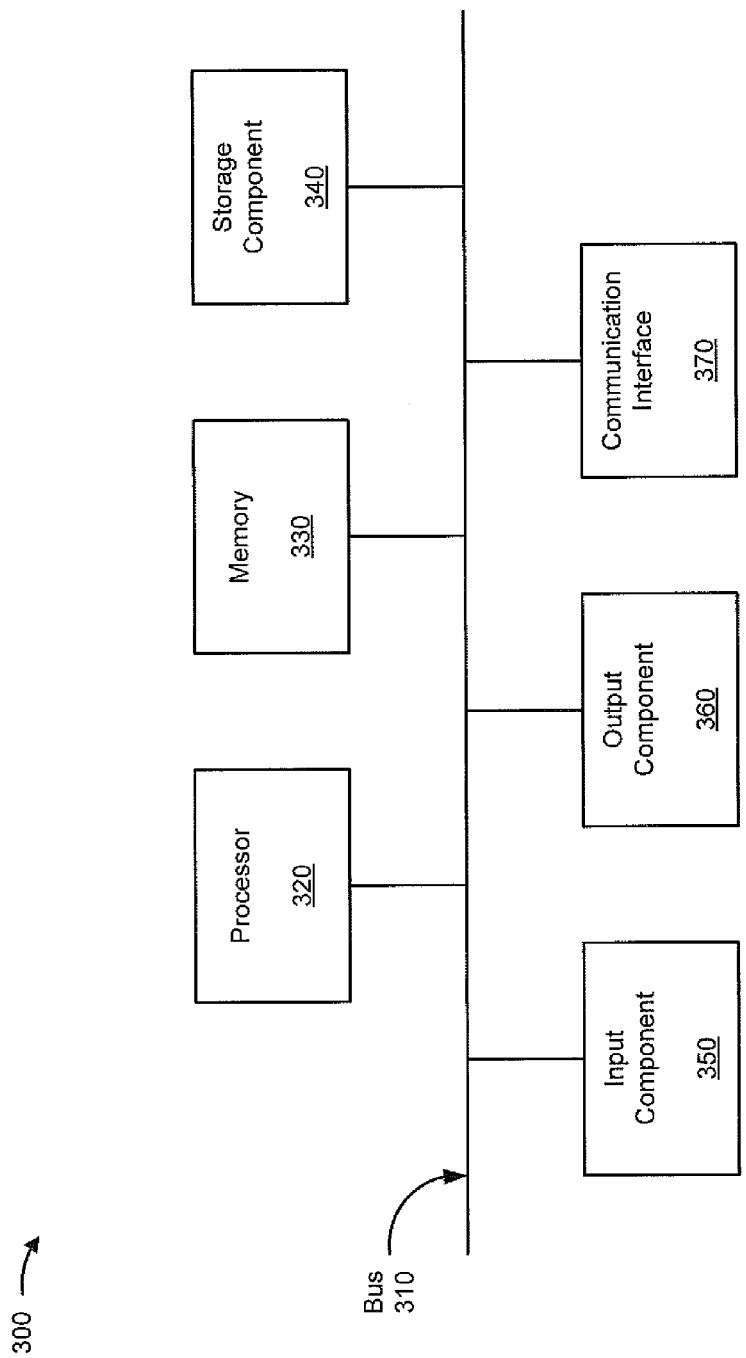
FIG. 3 is a diagram of example components of one or more devices of FIG. 2.

FIG. 3 is a diagram of example components of a device 300. Device 300 may correspond to client device 210, search management device 220, administrator device 230, internal search engine 240, internal storage device 250, external search engine 260, and/or external storage device 270. In some implementations, client device 210, search management device 220, administrator device 230, internal search engine 240, internal storage device 250, external search engine 260, and/or external storage device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing a search that provides internal and external search results, and flagging an external search result for review. In some implementations, one or more process blocks of FIG. 4 may be performed by client device 210. In some implementations, one or more process blocks of FIG. 4 may be performed by another device or a group of devices separate from or including client device 210, such as search management device 220, administrator device 230, internal search engine 240, internal storage device 250, external search engine 260, and/or external storage device 270.

As shown in FIG. 4, process 400 may include receiving a search query (block 410), and determining, based on the search query, internal search results and external search results (block 420). For example, client device 210 may receive a search query. In some implementations, client device 210 may provide, via a web portal, an input mechanism for a user to input the search query. The user may input the search query, and client device 210 may receive the input search query.

Client device 210 may determine or obtain, based on the search query, internal search results and external search results. For example, client device 210 may provide the search query (e.g., via search management device 220) to internal search engine 240 and/or external search engine 260. Internal search engine 240 may use the search query to perform a first search of internal storage devices 250 for internal documents related to the search query, and external search engine 260 may use the search query to perform a second search of external storage devices 270 for external documents related to the search query. Internal search engine 240 may provide, as internal search results, information that identifies and/or links to the internal documents. Internal search engine 240 may provide the information to client device 210 (e.g., via search management device 220). Similarly, external search engine 260 may provide, as external search results, information that identifies and/or links to the external documents. External search engine 260 may provide the information to client device 210 (e.g., via search management device 220).

A document may refer to, for example, a web page, a file, text content, audio content, video content, or the like. An internal document may refer to a document that has been marked as internal, that has been indexed in an internal index, and/or that is stored by internal storage device 250. An internal document may include, for example, a confidential document, a private document, a training manual, a web page internal to a private network (e.g., a company intranet), etc. An external document may refer to a document that has not been marked as internal (or that has been marked as external), that has not been indexed in an internal index, and/or that is stored by external storage device 270. An external document may include, for example, a web page external to a private network (e.g., a public web page), a public document, etc. In some implementations, search management device 220 may use input from an administrator (e.g., via administrator device 230) to identify a document as internal or external.

Client device 210 may determine whether a particular search result is an internal search result or an external search result. For example, search management device 220 may identify search results received from internal search engine 240 as internal search results, and may identify search results received from external search engine 260 as external search results. Additionally, or alternatively, search management device 220 may identify search results as internal or external based on information received from administrator device 230, as described in more detail elsewhere herein.

As further shown in FIG. 4, process 400 may include providing the internal search results and the external search results (block 430), and receiving an indication of an interaction with an internal search result or an external search result (block 440). For example, client device 210 may receive the internal search results and the external search results, and may provide and/or present the internal search results and the external search results for display. In some implementations, client device 210 may present the internal search results and the external search results in a different manner, such that a user may visually distinguish between the internal search results and the external search results.

For example, client device 210 may present a marking that differentiates internal and external search results; may present internal and external search results in different user interfaces, windows, tabs, etc.; may present internal and external search results in different sections of the same user interface and/or window; may present internal and external search results using different color text, different highlighting, etc; or the like. In some implementations, client device 210 may receive input (e.g., from a user, an administrator, and/or another device, such as administrator device 230) that indicates how internal and external search results are to be provided such that the internal and external search results are visually distinguishable. Additionally, or alternatively, client device 210 may provide search results based on a weight (e.g., a weight determined based on the search query, a weight determined based on administrator input, etc.), or based on another ranking technique or scheme. For example, internal results may be presented above external results as a matter of course, or external results can be presented above internal results as a matter of course. Alternatively, the order of presentation of results may be based on other techniques such as counting the number and quality of links to a result, or a frequency that a particular result has been selected in prior searches.

Client device 210 may receive an indication of an interaction with an internal search result or an external search result (e.g., that is provided for display). For example, a user may select a search result that is provided for display (e.g., using an input mechanism, such as by clicking on a search result, tapping a search result using a touch screen display, etc.). Client device 210 may receive an indication of the selected search result (e.g., a selected internal search result or a selected external search result).

As further shown in FIG. 4, process 400 may include determining whether the selected search result is an internal search result or an external search result (block 450). For example, client device 210 may determine whether a selected search result (e.g., with which the user has interacted) is an internal search result or an external search result. In some implementations, client device 210 may make this determination based on whether the selected search result is identified as an internal search result or an external search result. Additionally, or alternatively, client device 210 may make this determination based on a section, user interface, window, etc., in which the search result is presented (e.g., without checking a marking of the search result).

As further shown in FIG. 4, if the selected search result is an internal search result (block 450—INTERNAL), then process 400 may include providing a document associated with the internal search result (block 460). For example, if client device 210 determines that the selected search result is an internal search result, then client device 210 may provide (e.g., obtain or download for presentation) an internal document linked to the internal search result. Client device 210 may provide the internal document for display via the web portal.

As further shown in FIG. 4, if the selected search result is an external search result (block 450—EXTERNAL), then process 400 may include providing (e.g., obtaining or downloading for presentation) a document associated with the external search result, and providing an input mechanism for flagging the external search result (block 470). For example, if client device 210 determines that the selected search result is an external search result, then client device 210 may provide an external document linked to the external search result. Client device 210 may provide the external document for display via the web portal.

Additionally, or alternatively, client device 210 may provide an input mechanism for flagging the external search result. Client device 210 may provide the input mechanism for display via the web portal (e.g., on a user interface that also provides the external search result, such as in a ribbon displayed above, below, to the left of, to the right of, etc., the external document). The input mechanism may permit a user to flag an external search result. For example, the input mechanism may permit the user to flag an external search result as relevant to a search (e.g., relevant to a search query used to generate the external search result), to flag the external search result as irrelevant to the search, to flag the external search result as helpful, to flag the external search result as unhelpful, to flag the external search result as offensive, to flag the external search result as being contrary to company policy, etc.

When a user flags an external search result, a notification may be sent to an administrator (e.g., via a search management portal), and the administrator may decide whether to approve or reject the external search result for presentation as an internal search result (e.g., for a future search), as described in more detail in connection with FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
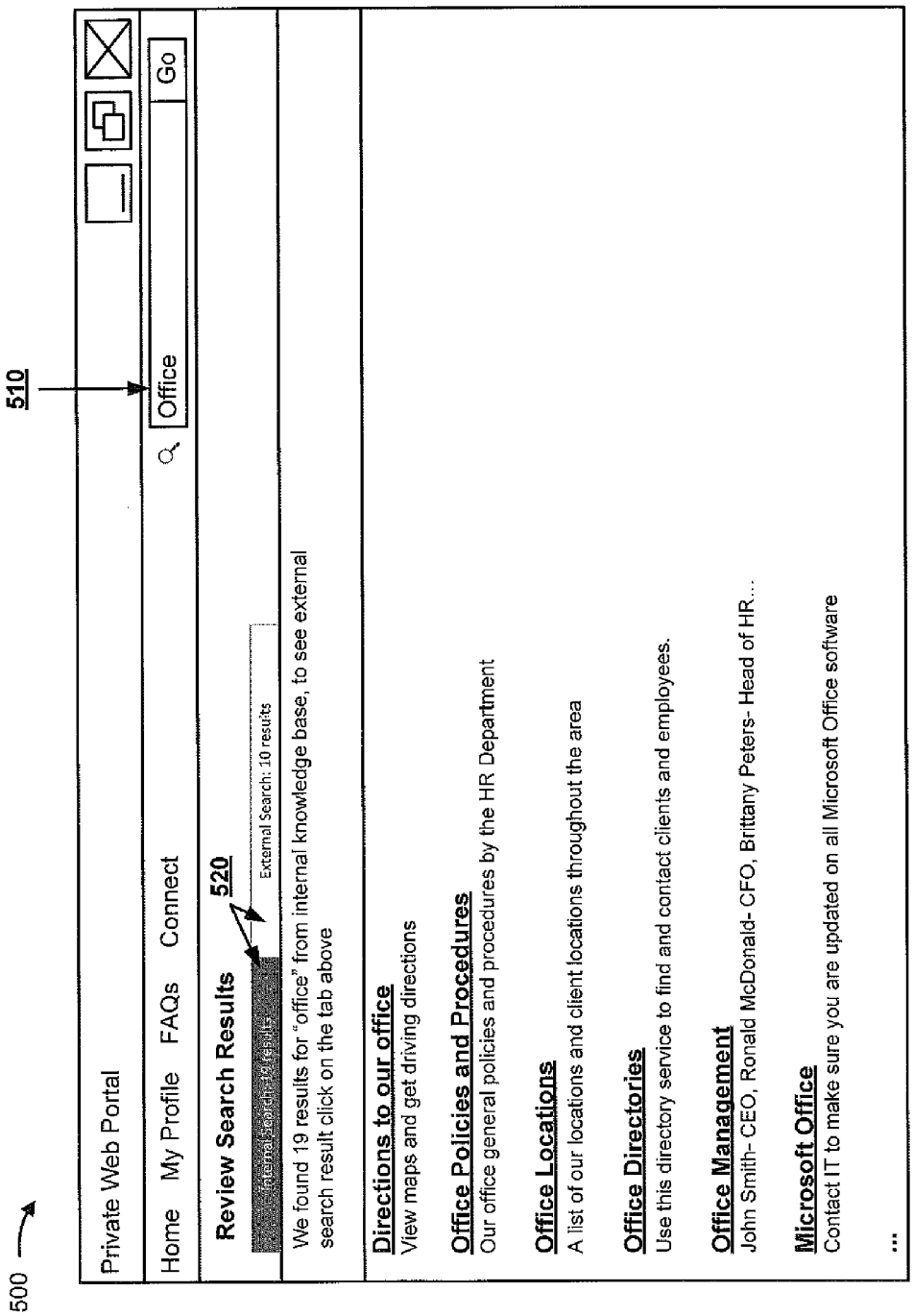
FIGS. 5A-5C are diagrams of an example implementation relating to the example process shown in FIG. 4.
Figure 5B:
Figure 5C:
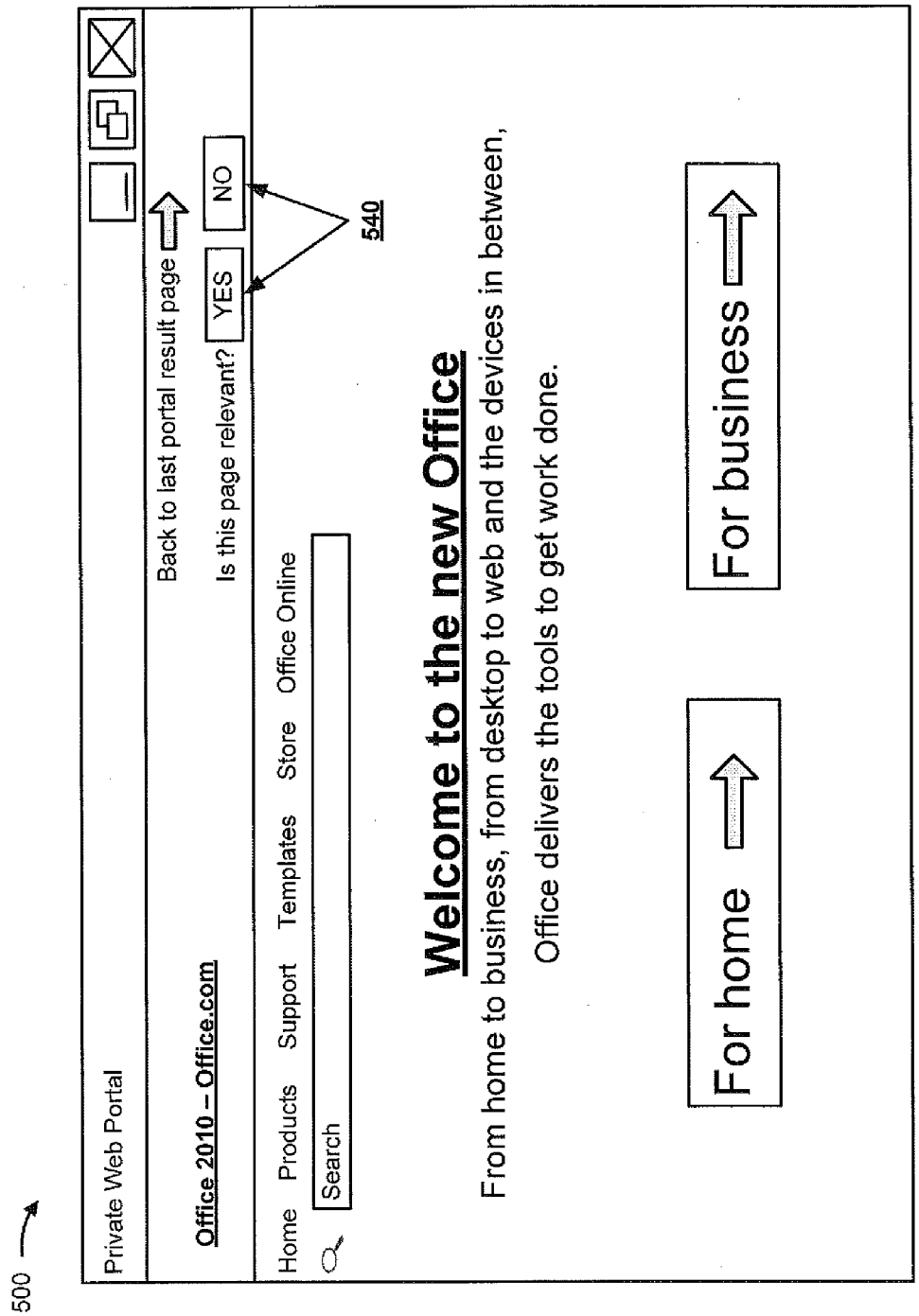

FIGS. 5A-5C are diagrams of an example implementation 500 relating to example process 400 shown in FIG. 4. FIGS. 5A-5C show an example of performing a search that provides internal and external search results, and flagging an external search result for review.

As shown in FIG. 5A, and by reference number 510, assume that a user inputs a search query via an input mechanism of a private web portal accessible via client device 210. For example, assume that the user inputs the search query "office." Based on the user input, assume that internal search engine 240 searches for internal documents relating to the search query "office," and returns internal search results (e.g., marked as internal by search management device 220, returned from internal search engine 240, etc.). Similarly, assume that external search engine 260 searches for external documents relating to the search query "office," and returns external search results (e.g., marked as external by search management device 220, returned from external search engine 260, etc.). As shown by reference number 520, assume that client device 210 provides the internal search results and the external search results via different tabs of the web portal. Further, assume that the "internal search results" tab is selected, and that the web portal provides internal search results for display, as shown.

As shown in FIG. 5B, assume that the user interacts with the "external search results" tab. Based on the user interaction, assume that the web portal provides the external search results for display, as shown. As shown by reference number 530, assume that the user selects (e.g., clicks on) an external result shown as "Office 2010—Office.com."

As shown in FIG. 5C, assume that the user interaction causes client device 210 (e.g., via the web portal) to provide an external document linked to the "Office 2010—Office.com" search result. For example, assume that client device 210 provides an external web page, linked to the "Office 2010—Office.com" search result, for display. As shown by reference number 540, assume that the web portal provides an input mechanism for the user to flag the external web page as relevant or irrelevant (e.g., to the search query "office", or more generally as containing business relevant information). Assume that the user flags the external web page as relevant, which causes a notification to be sent to an administrator for review, as described in more detail elsewhere herein.

As indicated above, FIGS. 5A-5C are provided merely as an example. Other examples are possible and may differ from what was described with regard to FIGS. 5A-5C.

Figure 6:
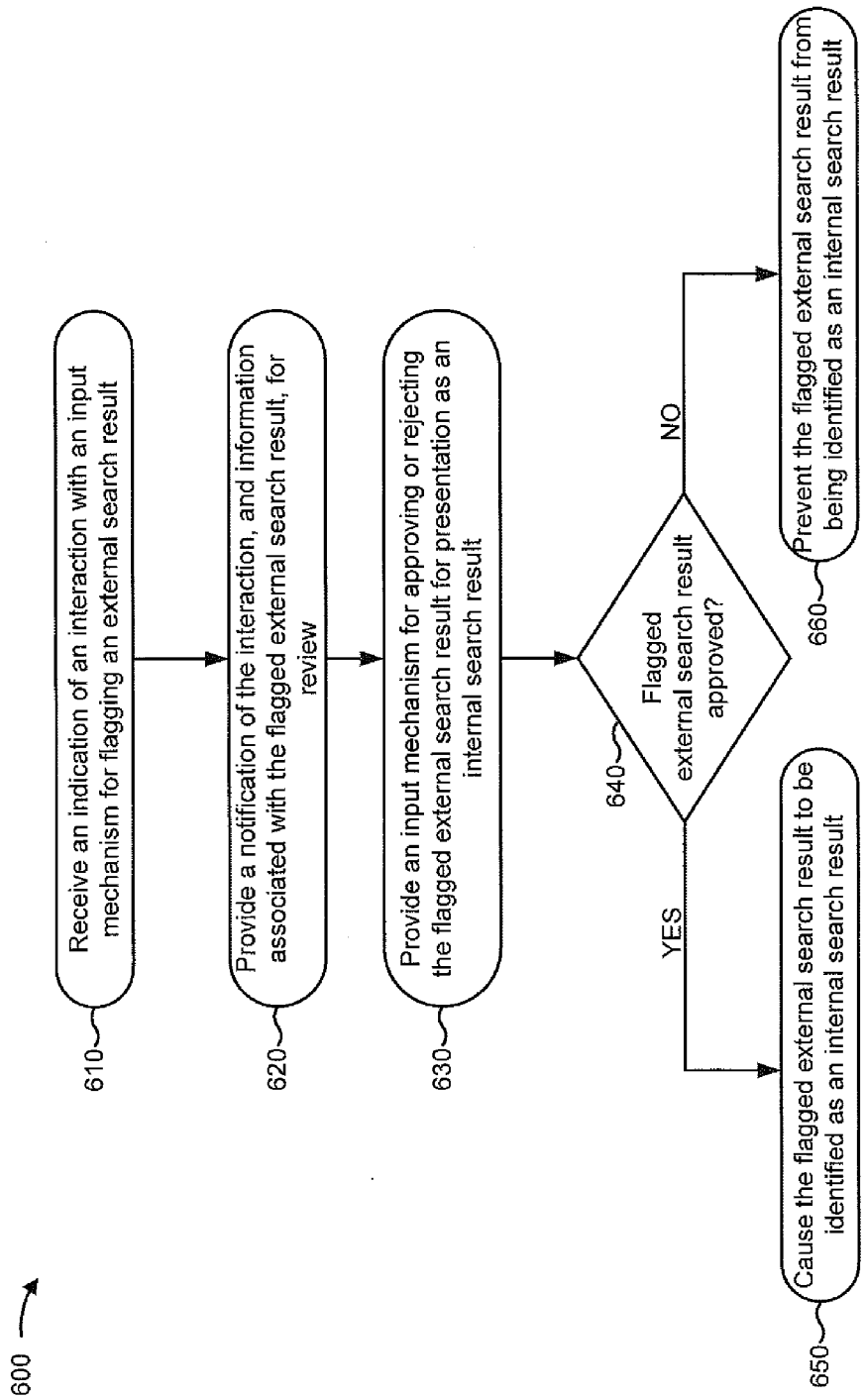
FIG. 6 is a flow chart of an example process for determining whether to identify a flagged external search result for presentation as an internal search result.

FIG. 6 is a flow chart of an example process 600 for determining whether to identify a flagged external search result for presentation as an internal search result. In some implementations, one or more process blocks of FIG. 6 may be performed by administrator device 230. In some implementations, one or more process blocks of FIG. 6 may be performed by another device or a group of devices separate from or including administrator device 230, such as client device 210, search management device 220, internal search engine 240, internal storage device 250, external search engine 260, and/or external storage device 270.

As shown in FIG. 6, process 600 may include receiving an indication of an interaction with an input mechanism for flagging an external search result (block 610), and providing a notification of the interaction, and information associated with the flagged external search result, for review (block 620). For example, administrator device 210 may receive (e.g., from client device 210 and/or search management device 220) an indication of an interaction with an input mechanism for flagging an external search result. As described in connection with FIG. 4, a user may use client device 210 to select an external search result, and may interact with an input mechanism to flag the external search result (e.g., as relevant, irrelevant, helpful, unhelpful, etc.).

Based on the user interaction, client device 210 may provide, to administrator device 230 (e.g., via search management device 220), a notification of the interaction. Additionally, or alternatively, search management device 220 may provide the notification after a threshold quantity of users have flagged the external search result (e.g., using a particular type of flag). Additionally, or alternatively, search management device 220 may provide the notification when a search result rating, associated with the external search result, satisfies a threshold. For example, a user may flag the external search result with a positive rating (e.g., may flag the external search result as relevant) or a negative rating (e.g., may flag the external search result as irrelevant). Search management device 220 may adjust the search result rating based on the flag (e.g., may increment the search result rating for a positive rating, may decrement the search result rating for a negative rating, etc.), and may provide the notification to administrator device 230 when the search result rating satisfies a threshold value.

Administrator device 230 may provide a notification of the interaction for display, such as via a search management portal. Additionally, or alternatively, administrator device 230 may provide information associated with the flagged external search result for display, such as information that identifies the flagged external search result (e.g., a name of an external search result and/or an external document linked with the external search result, a uniform resource locator associated with the external search result and/or the external document, a title of an external document linked to the external search result, etc.), an indication of the type of flag associated with the flagged external search result (e.g., a flag that indicates that the external search result is relevant, irrelevant, helpful, unhelpful, offensive, contrary to company policy, etc.), an indication of a quantity of times the external search result was flagged (e.g., with a particular type of flag), an indication of a quantity of users that flagged the external search result (e.g., with a particular type of flag), an indication of a time associated with one or more flags (e.g., a time that an external search result was flagged), or the like.

As further shown in FIG. 6, process 600 may include providing an input mechanism for approving or rejecting the flagged external search result for presentation as an internal search result (block 630), and determining whether the flagged external search result was approved (block 640). For example, administrator device 230 may provide an input mechanism that permits an administrator to approve or reject the flagged external search result for presentation as an internal search result (e.g., for a future search that identifies the flagged external search result). As an example, administrator device 230 may provide, via the search management portal, an approve button and/or a reject button associated with a flagged external search result. The administrator may use the approve button to approve the flagged external search result, and may use the reject button to reject the flagged external search result. Administrator device 230 may determine whether the flagged external search result was approved or rejected.

As further shown in FIG. 6, if the flagged external search result is approved (block 640—YES), then process 600 may include causing the flagged external search result to be identified as an internal search result (block 650). For example, administrator device 230 may determine that the flagged external search result is approved based on an administrator interacting with an input mechanism (e.g., an approve button). In this case, administrator device 230 may cause the flagged external search result to be identified as an internal search result.

In some implementations, administrator device 230 may send the flagged search result identifier to internal search engine 240. Internal search engine 240 may index and store information associated with an external document linked with the flagged search result identifier, such that the external document (or the index entry of the external document) is searched by internal search engine 240 (and marked as an internal search result) in future searches. In this case, search management device 220 may receive internal search results from internal search engine 240, may receive external search results from external search engine 260, and may compare the internal search results to the external search results to determine whether there are any duplicate search results. Search management device 220 may remove duplicates from the external search results, such that duplicate search results (e.g., which have already been approved for presentation as internal search results) are presented as internal search results only.

Additionally, or alternatively, administrator device 230 may send a flagged search result identifier, that identifies the flagged external search result, to search management device 220. Additionally, or alternatively, administrator device 230 may provide an instruction to mark external search results, that match the flagged search result identifier, as internal search results. When search management device 220 receives external search results from external search engine 260, search management device 220 may compare the search result identifiers for the received search results to the flagged search result identifier. If there is a match, then search management device 220 may mark a received external search result as an internal search result before providing the external search result to client device 210. Client device 210 may provide the flagged external search result for display (e.g., may present the flagged external search result) in a same manner as internal search results (or in a different manner than internal search results and external search results). A search result identifier may refer to, for example, a name associated with the external search result, a uniform resource locator associated with the external search result, a title associated with the external search result, etc.

In some implementations, search management device 220 may store an internal flag indicator that indicates that the external search result is to be marked as an internal search result (e.g., is to be marked for presentation in a same manner as internal search results). Additionally, or alternatively, search management device 220 may store an indication of a relationship between the internal flag indicator and the flagged search result identifier. When search management device 220 receives an external search result with a search result identifier that matches the flagged search result identifier, search management device 220 may mark the external search result as an internal search result (e.g., for presentation in a same manner as an internal search result) based on the relationship.

As further shown in FIG. 6, if the flagged external search result is not approved (block 640—NO), then process 600 may include preventing the flagged external search result from being identified as an internal search result (block 660). For example, administrator device 230 may determine that the flagged external search result is rejected based on an administrator interacting with an input mechanism (e.g., a reject button). In this case, administrator device 230 may prevent the flagged external search result from being marked as an internal search result. Although not illustrated, a same or similar action may prevent the flagged external search result from being presented for display as an external search result. In other words, the flagged external search result may be classified in a manner that prevents display of the flagged external search result entirely.

In some implementations, administrator device 230 may send a flagged search result identifier, that identifies the flagged external search result, to search management device 220. Additionally, or alternatively, administrator device 230 may provide an instruction to prevent external search results, that match the flagged search result identifier, from being marked as internal search results. Additionally, or alternatively, administrator device 230 may provide an instruction to mark external search results, that match the flagged search result identifier, as external search results. For example, assume that an administrator approves an external search result at a first time, and then rejects the same external search result at a later time. In this case, administrator device 230 may provide an instruction, to search management device 220, that deletes a previous instruction (e.g., an internal flag indicator) that caused search management device 220 to mark the external search result as an internal search result. Additionally, or alternatively, administrator device 230 may not send an instruction to search management device 220, causing search management device 220 to continue to mark external search results as external (e.g., when an administrator has not previously approved the external search result).

In some implementations, search management device 220 may store an external flag indicator that indicates that the external search result is to be marked as an external search result, (e.g., is to be marked for presentation in a same manner as other external search results). Additionally, or alternatively, search management device 220 may store an indication of a relationship between the external flag indicator and the flagged search result identifier. When search management device 220 receives an external search result with a search result identifier that matches the flagged search result identifier, search management device 220 may mark the external search result as an external search result (e.g., for presentation in a same manner as an external search result) based on the relationship. Additionally, or alternatively, search management device 220 may prevent the external search result from being presented for display (e.g., by client device 210) based on the relationship. For example, search management device 220 may prevent the external search result from being provided to client device 210, such as when the flagged search result identifier indicates the presence of malicious or inappropriate content.

In this way, an administrator may control a manner in which search results are provided to a user, so that the user may have greater confidence in the search results. Additionally, an administrator may prevent search results, that are not safe to view, from being presented for display.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of determining whether to mark a flagged external search result for presentation as an internal search result. For the purpose of FIGS. 7A-7D, assume that the operations described herein in connection with FIGS. 5A-5C have been performed, and that the user has flagged an external web page, linked to the "Office 2010—Office.com" search result, as relevant.

As shown in FIG. 7A, assume that an administrator interacts with administrator device 230 to cause a search management portal to be provided for display. Using the search management portal, the administrator may manage a knowledge base of internal documents and/or internal search results. As shown by reference number 710, assume that when a user flags an external search result, information associated with the external search result is provided to administrator device 230 (e.g., via the search management portal, which may be hosted on another device), and provided for display by administrator device 230. For example, assume that the search management portal provides a title of an external document linked with the flagged external search result (e.g., "Office 2010—Office.com"), a description of the external document (not shown), a uniform resource locator (URL) that links to with the external document (e.g., "office.microsoft.com/en-us/products/"), a quantity of times the external search result has been flagged with flags of different types (e.g., 1 like, 0 dislikes), a time of the most recent flag (e.g., "Jun. 8, 2012, 12:21:10 PM"), any tags (e.g., search queries) associated with the external search result (e.g., "office 2010"), and any approved topics associated with the external search result. As shown by reference number 720, assume that the search management portal further provides input mechanisms for the administrator to approve or reject the external search result for presentation as an internal search result, or to edit presentation information that controls a manner in which a flagged search result is presented for display. As shown, assume that the administrator interacts with an approve button to approve the external search result.

As shown in FIG. 7B, assume that interaction with the approve button causes the search management portal to provide a user interface that permits the administrator to edit presentation information associated with the external search result and/or the external document. For example, the administrator may edit a title associated with the external search result, a URL associated with the external search result, a description of the external document (e.g., which may appear when the external search result is presented as an internal search result), one or more categories associated with the external search result (e.g., which may be used by users to navigate to an external document using the private web portal), an option to mark the external search result as recommended content (e.g., a recommendation which may be presented for display along with the external search result), a topic associated with the external search result, a tag associated with the external search result (e.g., a search query that would cause the external search result to be identified for presentation), or the like. As shown by reference number 730, assume that the administrator associates the external search result with a topic shown as "Office for Windows 2010." Although a single topic is shown in FIG. 7B, it should be understood that an external search result may be associated with multiple topics, in some implementations.

FIG. 7C shows an example topic page that may be provided for display via a web portal when a user searches for and/or navigates to the topic page. For example, assume that a user navigates to a topic page for "Office for Windows 2010" using a web portal (e.g., via client device 210). As shown by reference number 740, because the administrator has associated the external search result with this topic, the external search result is presented via the topic page.

For the purpose of FIG. 7D, assume that the administrator has approved the flagged external search result for presentation as an internal search result. Assume that, at a later time, the user (or another user) provides input that causes a search to be performed using the search query "office." As shown by reference number 750, the approved external search result, which previously had been presented as an external search result (e.g., see FIG. 5B), is now presented as an internal search result. In this way, the user may have greater trust of the content associated with the external search result, knowing that the external search result has been approved by an administrator. The presence of an approved external search result may be indicated, for example, by an icon, by an image (as shown in FIG. 7D, a star), by text (also shown in FIG. 7D "Approved external search result"), by a different color link, by italicization, or by a combination of these or other alterations from the manner in which internal search results are presented.

As indicated above, FIGS. 7A-7D are provided merely as an example. Other examples are possible and may differ from what was described with regard to FIGS. 7A-7D.

Implementations described herein assist an administrator in adding relevant external content to a private web portal based on user feedback. Furthermore, implementations described herein assist a user by providing a mechanism for rating search results, and by providing more relevant search results.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information that comprises a search query;
cause a first search of internal documents to be performed, using the search query, to identify one or more internal search results;
cause a second search of external documents to be performed, using the search query, to identify one or more external search results;
cause the one or more internal search results and the one or more external search results to be presented for display,
the one or more internal search results being presented for display to visually distinguish the one or more internal search results from the one or more external search results;
receive a first indication indicating that an external search result, of the one or more external search results, has been flagged for review;
provide, based on receiving the first indication, a notification that the external search result has been flagged for review;
determine that the external search result has been approved for presentation as an internal search result based on providing the notification;
store a second indication indicating that the external search result is to be identified as an internal search result for a future search based on determining that the external search result has been approved for presentation as an internal search result;

cause a third search, that identifies the external search result, to be performed after storing the second indication; and cause the external search result to be presented for display as the internal search result based on the third search and further based on storing the second indication.

2. The device of claim 1, where the one or more processors, when storing the second indication are to:

store a flagged search result identifier that identifies the external search result; and where the one or more processors are further to:

receive a particular external search result after storing the flagged search result identifier;

compare a search result identifier, associated with the particular external search result, and the flagged search result identifier; and selectively identify the particular external search result as the internal search result based on comparing the search result identifier and the flagged search result identifier, the particular external search result being identified as the internal search result when the search result identifier and the flagged search result identifier match, and the particular external search result not being identified as the internal search result when the search result identifier and the flagged search result identifier do not match.

3. The device of claim 1, where the one or more processors are further to:

receive a third indication indicating an interaction with the external search result based on causing the one or more internal search results and the one or more external search result to be presented for display;

provide an external document, linked to the external search result, based on receiving the third indication;

provide an input mechanism for flagging the external search result based on receiving the third indication; and receive a fourth indication indicating an interaction with the input mechanism for flagging the external search result;

where the one or more processors, when receiving the fourth indication, are to:

receive the fourth indication based on receiving the third indication.

4. The device of claim 1, where the one or more processors are further to:

provide an input mechanism for approving the external search result for presentation as the internal search result based on receiving the first indication;

receive a third indication indicating an interaction with the input mechanism; and where the one or more processors, when determining that the external search result has been approved for presentation as the internal search result, are to:

determine that the external search result has been approved for presentation as the internal search result based on receiving the third indication.

5. The device of claim 1, where the one or more processors, when storing the second indication, are to:

store information associated with the external search result in an internal index used to identify the one or more internal search results.

6. The device of claim 1, where, when causing the one or more internal search results and the one or more external search results to be presented for display, the one or more processors are to:

cause the one or more internal search results to be presented for display in a first manner; and cause the one or more external search results to be presented for display in a second manner that is different from the first manner; and the one or more processors are further to:

receive, after the external search result has been approved for presentation in the first manner, a third indication indicating that the external search result has been rejected for presentation in the first manner; and delete the second indication based on receiving the third indication.

7. The device of claim 6, where:

the internal search result is associated with information that is restricted to particular users, the external search result is associated with information that is not restricted to the particular users, and the external search result is presented for display differently than the internal search result.

8. A computer-readable medium storing instructions, the instructions comprising:

one or more instructions that, when executed by one or more processors, cause the one or more processors to:

receive information that identifies a search query;

cause a first search to be performed, using the search query, to identify one or more internal search results;

cause a second search to be performed, using the search query, to identify one or more external search results, the second search being separate from the first search;

cause the one or more internal search results and the one or more external search results to be presented for display, the one or more internal search results being presented for display in a first manner, and the one or more external search results being provided for display in a second manner that is different from the first manner;

receive a first indication indicating that an external search result, of the one or more external search results, has been flagged for review;

provide, based on receiving the first indication, a notification that the external search result has been flagged for review;

determine whether the external search result has been approved or rejected for presentation as an internal search result based on providing the notification;

selectively store a second indication indicating that the external search result is to be presented as an internal search result based on determining whether the external search result has been approved or rejected, the second indication being stored when the external search result has been approved, and the second indication not being stored when the external search result has been rejected;

cause a third search, that identifies the external search result, to be performed after storing the second indication; and cause the external search result to be presented for display as the internal search result based on the third search and further based on storing the second indication.

9. The computer-readable medium of claim 8, where the one or more instructions, that cause the one or more processors to selectively store the second indication, cause the one or more processors to:
store an internal flag indicator;
store a flagged search result identifier that identifies the external search result;
store a third indication indicating a relationship between the internal flag indicator and the flagged search result identifier; and
where the one or more instructions, when executed by the one or more processors, further cause the one or more processors to:
receive a particular external search result after storing the internal flag indicator, the flagged search result identifier, and the third indication;
compare a search result identifier, associated with the particular external search result, and the flagged search result identifier;
identify the particular external search result as the internal search result based on comparing the search result identifier and the flagged search result identifier, and further based on storing the third indication; and
cause the particular external search result to be presented for display in the first manner based on identifying the particular external search result as the internal search result.

10. The computer-readable medium of claim 8, where the one or more instructions, when executed by the one or more processors, further cause the one or more processors to:
selectively store a third indication indicating that the external search result is not to be presented as the internal search result based on determining whether the external search result has been approved or rejected,
the third indication not being stored when the external search result has been approved, and
the third indication being stored when the external search result has been rejected.

11. The computer-readable medium of claim 10, where the one or more instructions, that cause the one or more processors to selectively store the third indication, cause the one or more processors to:
store an external flag indicator;
store a flagged search result identifier that identifies the external search result;
store a fourth indication indicating a relationship between the external flag indicator and the flagged search result identifier; and
where the one or more instructions, when executed by the one or more processors, further cause the one or more processors to:
receive a particular external search result after storing the external flag indicator, the flagged search result identifier, and the fourth indication;
compare a search result identifier, associated with the particular external search result, and the flagged search result identifier;
identify the particular external search result as the external search result based on comparing the search result identifier and the flagged search result identifier, and further based on storing the fourth indication; and cause the particular external search result to be presented for display in the second manner based on identifying the particular external search result as the external search result.

12. The computer-readable medium of claim 10, where the one or more instructions, that cause the one or more processors to selectively store the third indication, cause the one or more processors to:
store an external flag indicator;
store a flagged search result identifier that identifies the external search result;
store a fourth indication indicating a relationship between the external flag indicator and the flagged search result identifier; and
where the one or more instructions, when executed by the one or more processors, further cause the one or more processors to:
receive a particular external search result after storing the external flag indicator, the flagged search result identifier, and the fourth indication;
compare a search result identifier, associated with the particular external search result, and the flagged search result identifier;
identify the particular external search result as the external search result based on comparing the search result identifier and the flagged search result identifier, and further based on storing the fourth indication; and
prevent the particular external search result from being presented for display based on identifying the particular external search result as the external search result.

13. The computer-readable medium of claim 8, where the one or more instructions, that cause the one or more processors to selectively store the second indication cause the one or more processors to:
store a third indication indicating that the external search result is to be presented as the internal search result;
receive, after storing the third indication, a fourth indication indicating that the external search result has been rejected for presentation as the internal search result; and
delete the third indication based on receiving the fourth indication.

14. The computer-readable medium of claim 8, where particular information associated with the external search results undergoes a change, and the change to the particular information includes at least one of:
editing a title associated with the external search result,
assigning one or more categories associated with the external search result, or
marking the external search result as recommended content.

15. A method, comprising:
receiving, by a device, information that identifies a search query;
causing, by the device, a first search to be performed, using the search query, to identify one or more internal search results;
causing, by the device, a second search to be performed, using the search query, to identify one or more external search results;
causing, by the device, the one or more internal search results to be presented for displayed in a first manner;
causing, by the device, the one or more external search results to be presented for displayed in a second manner that is different from the first manner;

receiving, by the device, a first indication indicating that an external search result, of the one or more external search results, has been flagged for review;

providing, by the device and based on receiving the first indication, a notification that the external search result has been flagged for review;

determining, by the device, that the external search result has been approved for presentation in the first manner based on providing the notification;

storing, by the device, a second indication indicating that the external search result has been approved for presentation in the first manner based on determining that the external search result has been approved for presentation in the first manner;

causing, by the device, a third search, that identifies the external search result, to be performed after storing the second indication; and causing, by the device, the external search result to be presented for display in the first manner based on the third search and further based on storing the second indication.

16. The method of claim 15, where causing the third search to be performed further comprises:

receiving, after storing the second indication, information that identifies the search query or a related search query; and causing the third search to be performed using the search query or the related search query, where causing the external search result to be presented for display in the first manner comprises:

identifying the external search result for presentation in the first manner based on storing the second indication; and causing the external search result to be presented for display in the first manner based on identifying the external search result for presentation in the first manner.

17. The method of claim 15, further comprising:

storing a flagged search result identifier, that identifies the external search result, based on determining that the external search result has been approved for presentation in the first manner;

receiving a particular external search result after storing the flagged search result identifier;

determining that a search result identifier, associated with the particular external search result, and the flagged search result identifier match;

identifying the particular external search result for presentation in the first manner based on determining that the search result identifier and the flagged search result identifier match; and causing the particular external search result to be presented for display in the first manner based on identifying the particular external search result for presentation in the first manner.

18. The method of claim 15, further comprising:

storing a flagged search result identifier, that identifies the external search result, based on determining that the external search result has been approved for presentation in the first manner;

receiving a particular external search result after storing the flagged search result identifier;

determining that a search result identifier, associated with the particular external search result, and the flagged search result identifier do not match;

identifying the particular external search result for presentation in the second manner based on determining that the search result identifier and the flagged search result identifier do not match; and causing the particular external search result to be presented for display in the second manner based on identifying the particular external search result for presentation in the second manner.

19. The method of claim 15, further comprising:

receiving, after storing the second indication a third indication indicating that the external search result has been rejected for presentation in the first manner; and deleting the second indication based on receiving the third indication.

20. The method of claim 15, where storing the second indication comprises:

storing information associated with the external search result in an internal index used to identify the one or more internal search results.

* * * * *